(12) United States Patent
King

(10) Patent No.: US 7,185,446 B1
(45) Date of Patent: Mar. 6, 2007

(54) MOVABLE CATCH FOR AUTOMATIC TAPE MEASURE

(75) Inventor: Wade Charles King, Finksburg, MD (US)

(73) Assignee: Black & Decker Inc., Towson, MD (US)

( * ) Notice: Subject to any disclaimer, the term of this patent is extended or adjusted under 35 U.S.C. 154(b) by 0 days.

(21) Appl. No.: 11/283,950

(22) Filed: Nov. 21, 2005

(51) Int. Cl.
*G01B 3/10* (2006.01)

(52) U.S. Cl. .............................. 33/758; 33/755; 33/770

(58) Field of Classification Search ................. 33/758, 33/755, 770, 768
See application file for complete search history.

(56) References Cited

U.S. PATENT DOCUMENTS

| | | | |
|---|---|---|---|
| 1,623,138 A | | 4/1927 | Swift |
| 2,574,272 A | * | 11/1951 | McCully ..................... 33/770 |
| 3,601,896 A | | 8/1971 | Ledene |
| 4,466,194 A | | 8/1984 | Rutty |
| 5,600,894 A | | 2/1997 | Blackman et al. |
| 5,937,532 A | * | 8/1999 | Eirich et al. .................. 33/758 |
| 6,101,734 A | * | 8/2000 | Ten Caat et al. ............. 33/770 |
| 6,223,446 B1 | * | 5/2001 | Potter .......................... 33/764 |
| 2002/0026723 A1 | * | 3/2002 | Savalla ........................ 33/758 |
| 2006/0053649 A1 | * | 3/2006 | Greally ........................ 33/758 |

* cited by examiner

*Primary Examiner*—Yaritza Guadalupe-McCall
(74) *Attorney, Agent, or Firm*—Shook, Hardy & Bacon L.L.P.

(57) ABSTRACT

This invention is directed to a moveable catch. An automatic tape measure has a housing and a tape assembly. The tape assembly is supported in the housing and contains a tape switch, a reel, a drive, the movable catch, and a tape adapted to extend and retract from the front wall of the housing. The movable catch is coupled to a distal end of the tape. The movable catch includes a body, a spring, and a tongue. The tongue is pivotably coupled with the body via an axle. Thus, when the tape is extended, the tongue can pivot about the axle when it encounters an object in its path. The spring is positioned around the axle and causes the catch to return to its original, generally perpendicular position once the tongue passes the object.

22 Claims, 2 Drawing Sheets

MOVABLE CATCH FOR AUTOMATIC TAPE MEASURE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates generally to a tape measure and, more particularly, to an automatic tape measure with a movable catch that allows for easy extension of the tape when in use.

Automatic tape measures are generally used to measure an existing object or as a tool for marking and measuring distances. The tape is automatically extended from the front wall of the housing. Standard tapes include a catch or hook on the front of the tape to assist the user when marking and measuring distances and objects. However, when the tape is extended, the catch on the end of the tape may encounter objects that impede its progress. Thus, it would be desirable to manufacture a tape measure with a catch that rotates out of the way when it comes in contact with an object while being extended. It would also be desirable to provide rotation only in a single direction such that the catch can achieve its original purpose of assisting with the taking of measurements. Therefore, there is a need for a tape measure with a movable catch that is adapted to rotate out of the way when the catch comes in contact with an object during extension.

BRIEF SUMMARY OF THE INVENTION

This invention is directed to an automatic tape measure with a movable catch. The tape measure contains a housing and a tape assembly. The housing is a container configured to hold the tape assembly. The tape assembly includes a tape, a switch, a movable catch, a reel, and a drive. The switch is located in a top wall of the housing and is used in conjunction with the drive and reel to extend and retract the tape.

The movable catch is coupled to a distal end of the tape. The movable catch includes a body, a spring, and a tongue. The tongue is pivotably coupled with the body via an axle. Thus, when the tape is extended, the tongue can pivot about the axle when it encounters an object in its path. The spring is positioned around the axle and causes the catch to return to its original position once the tongue passes the object.

BRIEF DESCRIPTION OF THE SEVERAL VIEWS OF THE DRAWING

These and other objectives and advantages of the present invention will be more readily apparent from the following detailed description of the drawings of a preferred embodiment of the invention that are herein incorporated by reference and in which.

DETAILED DESCRIPTION OF THE INVENTION

Figure 1:
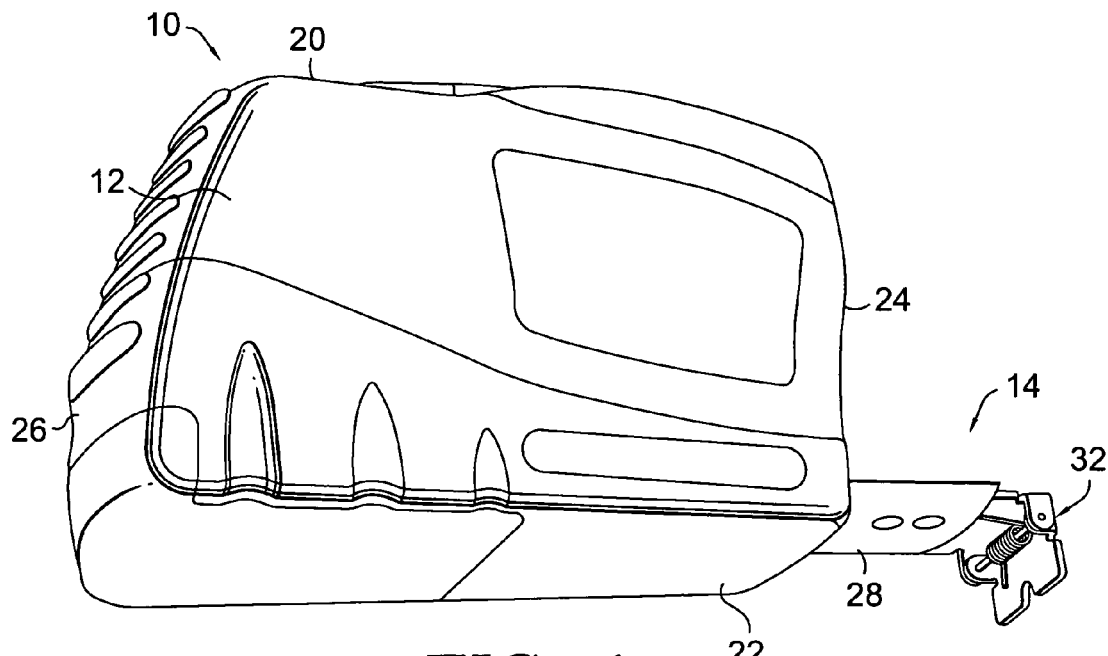
FIG. 1 is a perspective view of an automatic tape measure with a movable catch.
Figure 2:
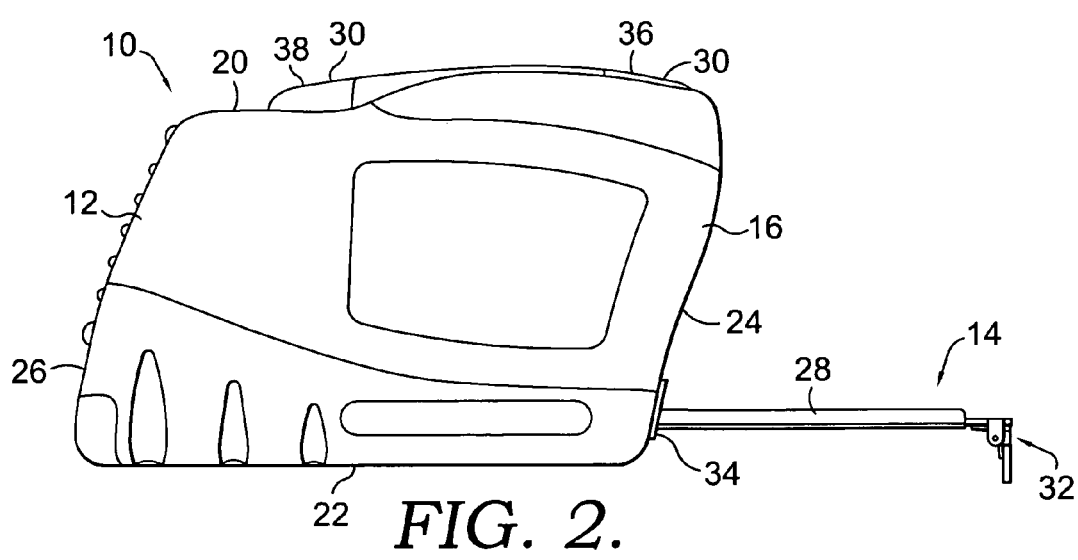
FIG. 2 is a side elevational view of the automatic tape measure with the movable catch.

With initial reference to FIGS. 1 and 2, an automatic tape measure according to the principles of the present invention is designated generally with the reference numeral 10. The tape measure 10 includes a housing 12 and a tape assembly 14. The housing 12 includes a pair of sidewalls 16, 18 (hidden), top and bottom walls 20, 22, and front and rear walls 24, 26. The housing 12 is an integrated unit constructed from molded plastic, however, any suitable material may be used. The housing 12 is configured to define a container that houses the tape assembly 14.

The tape assembly 14 includes a tape 28, a switch mechanism 30, a movable catch 32, a reel and a drive, not shown. The reel and drive are conventional items that are known in the art and not germane to this discussion. The tape 28 extends from an opening 34 in the front wall 24 as is understood by one of ordinary skill in the art. The extension of the tape 28 is controlled by the switch mechanism 30 located in the top wall 20 of the housing 12. The switch mechanism 30 includes an extension switch 36 and a retraction switch 38. It will be appreciated by one of ordinary skill in the art that the extension switch 36, when pressed, provides a forward extension of the tape 28 via the reel and the drive while the retraction switch 38, when pressed, provides or permits a rearward retraction of the tape 28.

Figure 3:
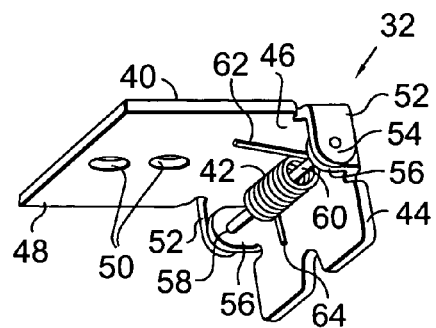
FIG. 3 is an enlarged perspective view of the movable catch of FIG. 1 with the tape removed.

Referring now to FIG. 3, the movable catch 32 will be discussed. The movable catch 32 includes a body 40, a spring 42, and a tongue 44. The body 40 is generally rectangular in nature and includes a forward portion 46 and a rearward portion 48. The rearward portion 48 contains a pair of apertures 50 used in coupling the movable catch 32 to the tape 28 in a manner readily understood by one of ordinary skill in the art. Any suitable attachment method may be used, such as bolts, pins, rivets or the like. The apertures 50 may be oval in shape to permit movement of the body 40 with respect to the tape 28 to permit inside and outside measurements. The forward portion 46 contains a pair of downwardly depending tabs 52, each tab containing an aperture 54. The apertures 54 are used in coupling the tongue 44 to the body 40, as will be further discussed below.

The tongue 44 depends downwardly from the body 40 and is oriented generally perpendicular thereto. The tongue 44 is generally rectangular and contains a pair of depending tabs 56 located near its upper portion. Each of the tabs 56 contains an aperture 58. The apertures 54 on the body 40 align with the apertures 58 on the tongue 44. The tabs 56 on the tongue 44 are located inwardly from the tabs 52 on the body 40. An axle 60 is placed within the apertures 54, 58 on the tabs 52, 56, to rotatably couple the tongue 44 with the body 40. It should be noted that, while the body 40 is illustrated as being generally flat, it is well within the scope of the present invention to make the body 40 curved downwardly from the sides to the middle such that the body 40 is curved to correspond with the arcuate shape of the tape 28 when it is extended and in its natural concavo-convex configuration.

Figure 4:
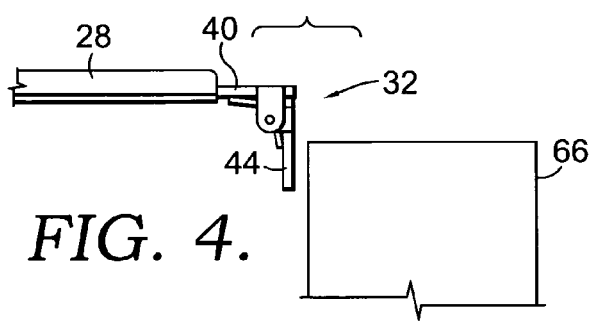
FIG. 4 is a side elevational view of the movable catch in an extended position and on a first side of an object, before contact.

The spring 42 is positioned around the axle 60 and contains first and second ends 62, 64. The first end 62 contacts an underside of the body 40 while the second end 64 contacts an inner side of the tongue 44. The spring 42 and spring ends 62, 64 cause the tongue 44 to be spring loaded and biased to a perpendicular orientation with respect to the body 40. In other words, the spring 42 maintains the catch 32 in the extended position, as shown in FIGS. 3, 4, and 7.

Figure 5:
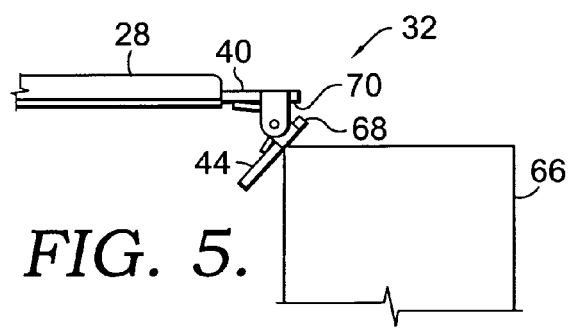
FIG. 5 is a view similar to FIG. 4, but with the movable catch in contact with the object and in a deflected position.
Figure 6:
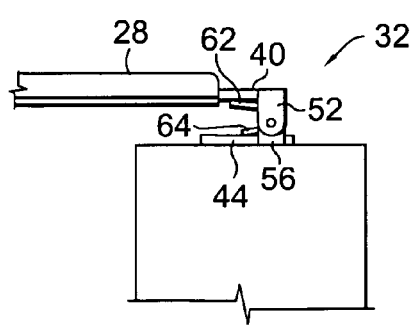
FIG. 6 is a view similar to FIG. 4, but with the movable catch in contact with the object and in a fully-deflected position.

The operation of the movable catch 32 will be discussed with reference to FIGS. 4–7. FIG. 4 shows the movable catch 32 in an extended position before coming into contact with an object 66. In the extended position, the tongue 44 is oriented generally perpendicular to the body 40. FIG. 5 shows the movable catch 32 in a deflected position after initial contact with the object 66 as the tape 28 is further extended. The tongue 44 has been deflected from its perpendicular orientation with respect to the body 40 by the object 66. FIG. 6 shows the movable catch 32 in the fully-deflected position during contact with the object 66. In the fully-deflected position the tongue 44 is oriented generally parallel to the body 40. FIG. 7 shows the tongue 44 has returned to its original extended position after the catch 32 has passed or cleared the object.

During use, the tape 28 is extended when the user presses the extension switch 36. While the extension switch 36 is pressed, the tape 28 extends toward an object 66. Before contact with the object, the catch 32 is in the extended position with the tongue 44 oriented generally perpendicular to the body 40, as illustrated in FIG. 4. As the tape 28 keeps extending, the catch 32 contacts the object 66 and the tongue 44 is deflected from the extended position, as illustrated in FIG. 5. With further extension of the tape 28, the catch 32 becomes fully collapsed where the tongue 44 is oriented generally parallel to the body 40, as illustrated in FIG. 6. While the spring is not fully shown in FIGS. 5 and 6, it will be appreciated by one of ordinary skill in the art that the rotation of the tongue 44 about the axle 60, causes the spring 42 to wind-up. Further extension of the tape 28 causes the catch 32 to move passed the object 66 and the spring 42 unwinds to move the tongue 44 back to its original position, as illustrated in FIG. 7.

Figure 7:
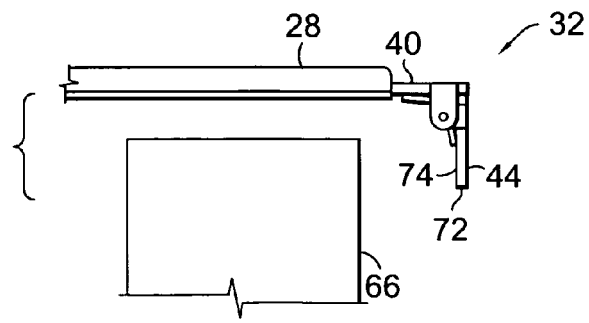
FIG. 7 is a view similar to FIG. 4, but with the movable catch in the extended position on a second side of the object, after contact.

It should be readily understood that the orientation of the tongue 44 with respect to the body 40 prevents the tongue 44 from rotating about the axle 60 past the perpendicular orientation illustrated in FIG. 7. In that regard, an upper edge 68 of the tongue 44 abuts a lower surface 70 of the body 40 when it is in its extended position, as illustrated in FIG. 4. This arrangement prevents a lower edge 72 of the tongue 44 from being able to move further away from the tape 28 than illustrated in FIG. 7 and thereby permits the user to use the catch 32 to take measurements by hooking the catch over the object 66 such that an inner surface 74 of the tongue 44 abuts a side of the object 66 being measured without collapsing in a direction opposite of that shown in FIGS. 4–7.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features sub-combinations are of utility and may be employed without reference to other features and sub-combinations. This is contemplated and within the scope of the claims.

What is claimed is:

1. A tape measure comprising:
   a housing having a top and a bottom wall, a pair of sidewalls, and a front and a back wall, the front wall having an opening contained therein; and
   a tape assembly supported in the housing, the tape assembly including:
      a tape adapted to extend and retract from the front wall of the housing; and
      a catch having a body coupled to the tape and a downwardly depending member coupled to the body, the member being automatically movable with respect to the body between a first position, where the member is generally perpendicular to the body, and a second position, where the member is generally parallel to the body, wherein the member is biased to the first position, wherein the member has a proximal end and a distal end, wherein the member has an outer face that generally faces away from the housing and an inner face that generally faces toward the housing, and wherein pressure on the outer face of the member adjacent its distal end moves the member from its first position toward its second position.

2. The tape measure of claim 1, wherein the member is biased by a torsion spring.

3. The tape measure of claim 2, wherein the torsion spring has first and second ends, the first end adjacent the body and the second end adjacent the member.

4. The tape measure of claim 1, wherein the member is pivotably coupled with the body about an axle.

5. The tape measure of claim 4, wherein the member is biased by a torsion spring and wherein the torsion spring is received on the axle.

6. The tape measure of claim 5, wherein the body includes a pair of downwardly depending tabs and wherein the downwardly depending tabs support the axle.

7. The tape measure of claim 6, wherein the downwardly depending member includes a pair of outwardly projecting tabs and wherein the downwardly depending member is supported on the axle via its outwardly projecting tabs.

8. The tape measure of claim 1, wherein the bias on the member automatically returns the member to its first position upon removal of pressure on the outer face of the member adjacent its distal end.

9. A tape measure comprising:
   a housing having a front wall with an opening therein; and
   a tape assembly supported in the housing, the tape assembly including:
      a tape adapted to extend and retract through the opening in the front wall of the housing; and
      a catch coupled to a distal end of the tape, the catch having a body, a downwardly depending member coupled to the body, the member being oriented generally perpendicular to the body in a first position, and a spring adjacent the body and the member for biasing the member to the first position, wherein the member is adapted to move between the first position and a second position.

10. The tape measure of claim 9, wherein the spring has first and second ends, wherein the first end is adjacent the body and the second end is adjacent the member and wherein the member automatically rotates from the first position toward the second position, against the bias of the spring, upon application of a force on an outer surface of the member adjacent its distal end.

11. The tape measure of claim 10, wherein the member is pivotably coupled with the body about an axle.

12. The tape measure of claim 11, wherein the first end is generally parallel to the body and wherein the second end is generally parallel to the member.

13. The tape measure of claim 12, wherein the first position is an extended position and wherein the second position is a deflected position.

14. The tape measure of claim 13, wherein the member is oriented generally parallel to the body in the deflected position.

15. A movable catch for use in a tape measure having a housing and a tape adapted to extend and retract from the housing, the movable catch including:
   a body having a means for coupling the body to the tape;
   a downwardly depending member movably coupled to the body, the member being oriented generally perpendicular to the body in a first position; and
   a biasing member adjacent the body and the member, the biasing member biasing the member to the first position, wherein the member is movable between the first position and a second position.

16. The movable catch of claim 15, wherein the biasing member is a spring, wherein the spring has first and second ends, wherein the first end abuts the body and the second end abuts the member, and wherein the member is movable from the first position to the second position against the bias of the biasing member upon application of a force on an outer surface of the member.

17. The movable catch of claim 16, wherein the member is pivotably coupled with the body.

18. The tape measure of claim 17, wherein the pivotal connection is about an axle.

19. The tape measure of claim 18, wherein the means for coupling the body to the tape includes a plurality of apertures therethrough for receiving rivets and wherein the spring is a torsion spring.

20. The tape measure of claim 19, wherein the first position is an extended position and wherein the second position is a deflected position.

21. The tape measure of claim 20, wherein the member is oriented generally parallel to the body in the deflected position and wherein the bias of the spring automatically moves the member back to the first position upon the removal of the force on the outer surface of the member.

22. The tape measure of claim 21, wherein the body includes a pair of downwardly depending tabs having an aperture therethrough for supporting the axle, wherein the member includes a pair of outwardly depending tabs having an aperture therethrough for supporting the axle, and wherein the member is pivotally coupled with the body via the axle.

* * * * *